United States Patent [19]

Lau et al.

[11] Patent Number: 5,695,594
[45] Date of Patent: Dec. 9, 1997

[54] METHOD OF MAKING A LIQUID CRYSTAL LIGHT VALVE

[75] Inventors: Aldrich N. K. Lau, Palo Alto; Damoder Reddy, Irvine; Akira Tomita, Redwood City; Lanchi P. Vo, San Jose; Brackin L. Andrews, Sunnyvale, all of Calif.; Kathleen Di Zio, Sunderland, Mass.; Hundi Kamath, Los Altos, Calif.

[73] Assignee: Raychem Corporation, Menlo Park, Calif.

[21] Appl. No.: 583,257

[22] Filed: Jan. 5, 1996

[51] Int. Cl.⁶ ........................................ B32B 7/00
[52] U.S. Cl. .................. 156/310; 156/314; 349/122; 359/74; 528/364
[58] Field of Search ........................ 156/310, 314; 528/364; 359/74; 349/122

[56] References Cited

U.S. PATENT DOCUMENTS

| | | |
|---|---|---|
| 4,435,047 | 3/1984 | Fergason . |
| 4,460,480 | 7/1984 | Kleiner et al. . |
| 4,685,771 | 8/1987 | West et al. . |
| 4,950,052 | 8/1990 | Fergason et al. . |
| 4,992,201 | 2/1991 | Pearlman . |
| 5,335,101 | 8/1994 | Reamey . |
| 5,395,550 | 3/1995 | Lau . |
| 5,405,551 | 4/1995 | Reamey et al. . |
| 5,427,713 | 6/1995 | Wartenberg et al. . |

FOREIGN PATENT DOCUMENTS

| | | |
|---|---|---|
| 0 205 261 A3 | 12/1986 | European Pat. Off. . |
| 0 268 877 A2 | 6/1988 | European Pat. Off. . |
| 0 272 585 A2 | 6/1988 | European Pat. Off. . |
| 0 275 999 A2 | 7/1988 | European Pat. Off. . |
| 0 313 053 A2 | 4/1989 | European Pat. Off. . |
| 0 538 553 A1 | 4/1993 | European Pat. Off. . |
| 61-151617 | 7/1986 | Japan ........................... 359/74 |
| WO 92/12219 | 7/1992 | WIPO . |
| WO 95/25777 | 8/1995 | WIPO . |

OTHER PUBLICATIONS

Asscher et al., J. Chem. Soc. (B) (1968), pp. 947–952.
Battais et al., Eur. Polym. J., vol. 19, No. 6, pp. 499–505 (1983).
Bertrais et al., Eur. Polym. J., vol. 18, pp. 785–790 (1982).
Scott et al., Macromolecules, vol 2. No. 4, pp. 428–431 (1969).
Rondestvedt et al., J. Org. Chem., vol. 42, No. 16, pp. 2680–2683 (1977).
Boutevin et al., J. Polym. Sci. Polym. Chem. Ed., vol. 19, pp. 511–522 (1981).
Scott et al., J. Org. Chem., vol. 29, pp. 83–86 (1964).
Boutevin et al., Makromol. Chem., vol. 183, pp. 2333–2345 (1982).
Starks, "Free Radical Polymerization," pp. 1–21 and 193–214 (Academic Press 1974).
Patent Abstracts of Japan, vol. 4, No. 155 (C–029)(of JP 55–099924 (Asahi Glass)).
Patent Abstracts of Japan, vol. 4, No. 34 (C–003)(of JP 5–007820 (Asahi Glass)).

*Primary Examiner*—John J. Gallagher
*Attorney, Agent, or Firm*—Herbert G. Burkard; Yuan Chao

[57] ABSTRACT

A method is disclosed for making a liquid crystal light valve in which the electro-optically active element is a liquid crystal composite sandwiched between two electrodes. The liquid crystal composite comprises plural volumes of liquid crystal material dispersed in a polymer matrix. By use of a tie layer, the problem of stress clearing is markedly reduced or eliminated. The tie layer material can be either a liquid crystal material or a telomer, crosslinkable or otherwise.

8 Claims, 3 Drawing Sheets

METHOD OF MAKING A LIQUID CRYSTAL LIGHT VALVE

TECHNICAL FIELD OF THE INVENTION

This invention relates to a method of making a liquid crystal light valve.

BACKGROUND OF THE INVENTION

Liquid crystal light valves have as the active light modulating element some form of liquid crystal material. The modulating element controls the transmission or not of incident light through the light valve via changes in the alignment of the liquid crystal material in response to an external stimulus, such as a temperature change or the application of an electric field.

One type of liquid crystal light valve employs a liquid crystal composite comprising plural volumes or droplets of a liquid crystal material dispersed, encapsulated, embedded, or otherwise contained within a polymer matrix. Exemplary disclosures of such composites include Fergason, U.S. Pat. No. 4,435,047 (1984) (hereinafter "Fergason '047"); West et al., U.S. Pat. No. 4,685,771 (1987); Pearlman, U.S. Pat. No. 4,992,201 (1991) (hereinafter "Pearlman '201"); and Dainippon Ink, EP 0,313,053 (1989). These light valves may be used in displays and window or privacy panels. Generally, such composites are light scattering and/or absorbing in the absence of a sufficient electric field (the "field-off state"), but are substantially light transmissive in the presence of such electric field (the "field-on state"). The electric field can be applied via electrodes disposed on either side of the composite.

In one method of making light valves with such liquid crystal composites, an electroded substrate is coated with an emulsion of the liquid crystal composite carried in a carrier medium. The carrier medium is allowed to evaporate, leaving behind the liquid crystal composite. A second electroded substrate is laminated over the liquid crystal composite, forming a sandwich of the liquid crystal composite between the two electroded substrates. Illustrative disclosures include Fergason '047; Pearlman '201; Andrews et al., U.S. Pat. No. 5,202,063 (1993) (hereinafter "Andrews '063"); Kamath et al., U.S. Pat. No. 5,233,445 (1993) (hereinafter "Kamath '445"); Reamey, U.S. Pat. No. 5,328,850 (1994); Reamey et al., U.S. Pat. No. 5,405,551 (1995) (hereinafter "Reamey '551"); Wartenberg et al., U.S. Pat. No. 5,427,713 (1995); Havens et al., application Ser. No. 08/217,268, filed Mar. 24, 1994 (hereinafter "Havens '268"); Reamey et al., application Ser. No. 08/333,006, filed Oct. 31, 1994; Lau et al., application Ser. No. 08/360,503, filed Dec. 21, 1994; and Cao et al., application Ser. No. 08/369,028, filed Jan. 5, 1995; the aforecited applications being commonly assigned to the assignee of the instant application. The foregoing disclosures are incorporated herein by reference.

When the second electroded substrate is laminated over the liquid crystal composite, pressure is typically applied to ensure complete contact. In combination with minute irregularities in the thickness of the liquid crystal composite layer and surface roughness and warpage in the first and/or second electroded substrates (in either the substrate or the electrode material itself, or both), the pressure may cause localized stresses in the liquid crystal composite, making it susceptible to stress-induced clearing. A liquid crystal composite light valve having this defect exhibits clear spots in the stressed areas and/or uneven opacity in the field-off state. Evidently, stress-clearing is undesirable, as it detracts from the aesthetic appearance of the light valve (as when it is used as a window or privacy panel) or from its performance (as when it is in a display). While it may be possible to reduce stress clearing by appropriate selection of the liquid crystal material and polymer matrix, it is difficult if not impossible to eliminate stress clearing entirely by materials selection alone.

SUMMARY OF THE INVENTION

We have invented a method of making a liquid crystal light valve comprising a liquid crystal composite, which eliminates or sharply reduces stress clearing. The method of this invention comprises the steps of:

providing a first electrode supported on a first support material;

applying over said first electrode a coating of a liquid crystal composite comprising plural volumes of liquid crystal material dispersed in a matrix material, said liquid crystal composite being carried in a carrier medium;

permitting said carrier medium to evaporate, leaving a layer of said liquid crystal composite disposed on said first electrode;

providing a second electrode supported on a second support material;

applying a tie layer material onto at least one of (i) the face of said layer of liquid crystal composite facing away from said first electrode and (ii) the face of said second electrode facing away from said second support material; and laminating said second electrode onto the face of said layer of liquid crystal composite facing away from said first electrode.

Preferably, the tie layer material is a liquid crystal material or an amphiphilic telomer.

BRIEF DESCRIPTION OF THE DRAWING(S)

DESCRIPTION OF THE PREFERRED EMBODIMENTS

Figure 1A:
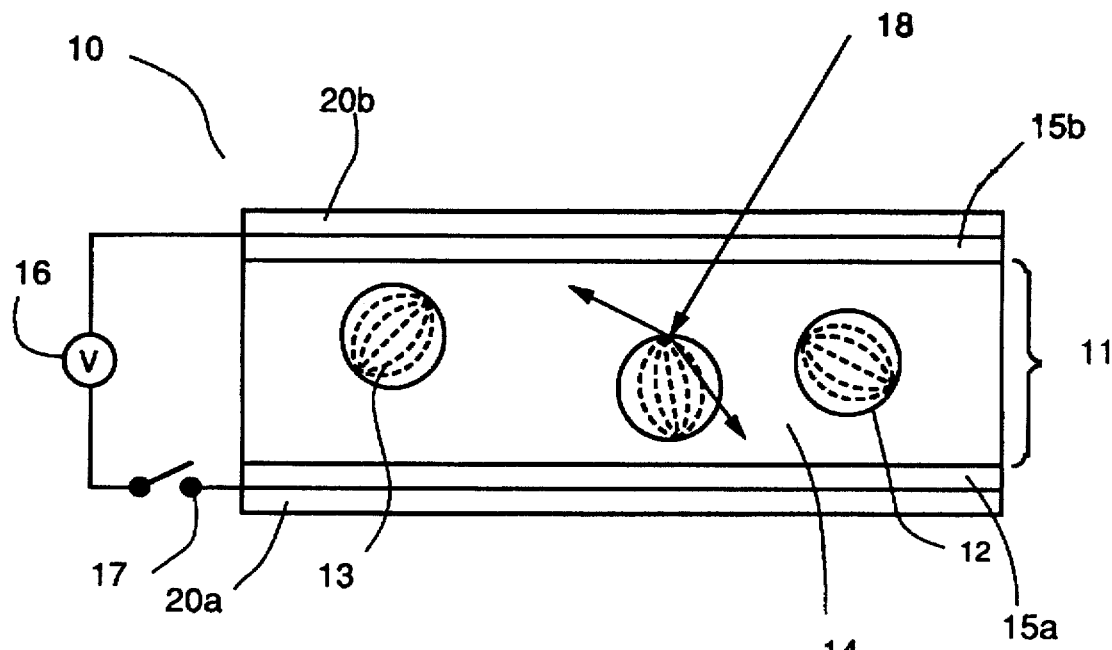
FIGS. 1a–1b show the manner of operation of a liquid crystal light valve made according to this invention.

FIG. 1a shows light valve 10 made from a liquid crystal composite, according to this invention. Light valve 10 comprises a liquid crystal composite 11 in which droplets or volumes 12 of nematic liquid crystal material 13 having a positive dielectric anisotropy are dispersed in a matrix material 14. Composite 11 is sandwiched between first and second electrodes 15a and 15b, made from a transparent conductor such as indium tin oxide ("ITO"). Electrodes 15a and 15b are supported by support materials 20a and 20b, which generally are transparent, as shown here, although, in the instance of a reflective display, rear support material 20b need not be transparent. Suitable transparent support materials 20a and 20b include glass, polycarbonate, polyester, and acrylic. The application or not of a voltage across electrodes 15a and 15b from power source 16 is controlled by switch 17, shown here in the open position corresponding to the field-off state. As a result, no voltage is impressed across composite 11 and the electric field experienced by liquid crystal material 13 is effectively zero. Due to surface interactions, the liquid crystal molecules preferentially lie with their long axes parallel to the curved interface with matrix material 14, resulting in a generally curvilinear alignment within each droplet. The curvilinear axes in different droplets 12 are randomly oriented, as symbolized by the differing orientations of the curvilinear patterns. Liquid crystal material 13 has an extraordinary index of refraction $n_e$ which is different from the index of refraction $n_m$ of matrix material 14 and an ordinary index of refraction $n_o$ which is the substantially the same as $n_m$. (Herein, two indices or refraction are said to be substantially the same, or matched, if they differ by less than 0.05, preferably less than 0.02.) Incident light ray 18 traveling through composite 11 has a high statistical probability of encountering at least one interface between matrix material 14 and liquid crystal material 13 in which the liquid crystal index of refraction with which it operatively interacts is $n_e$. Since $n_e$ is different from $n_m$, there is refraction, or scattering of light ray 18, both forwardly and backwardly, causing composite 11 to have a translucent or frosty appearance.

Figure 1B:
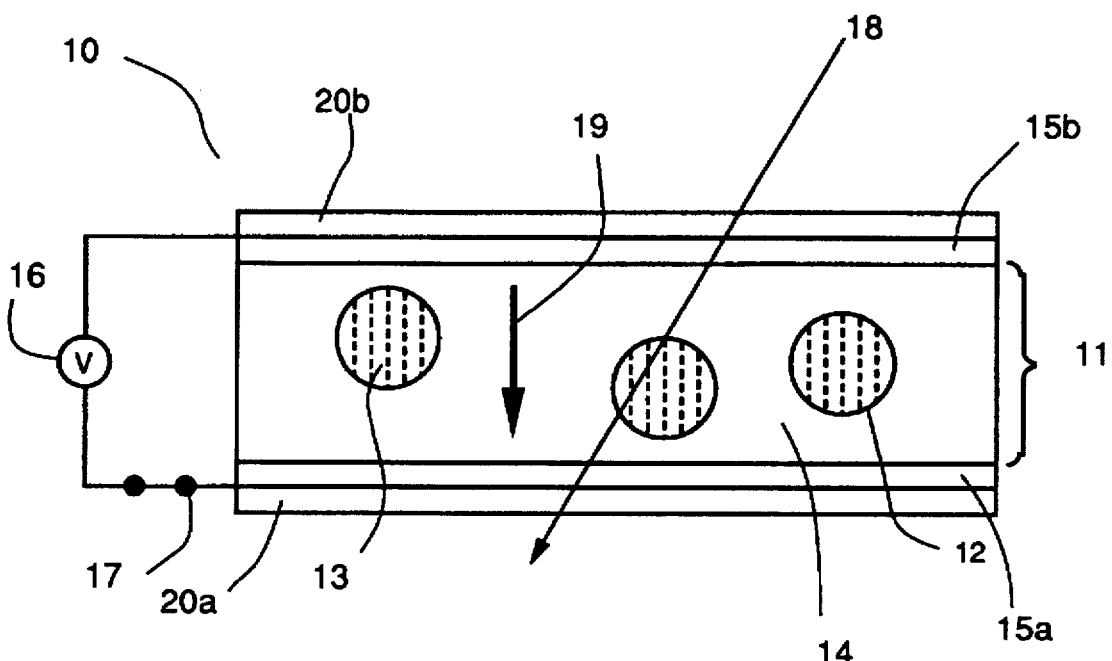

FIG. 1b shows light valve 10 in the field-on state, with switch 17 closed. An electric field is applied between electrodes 15a and 15b and across composite 11, with a directionality indicated by arrow 19. Liquid crystal material 13, being positively dielectrically anisotropic, aligns parallel to the electric field direction. (The required voltage is dependent inter alia on the thickness of the composite and typically is between 3 and 50 volts.) Further, this alignment with the field occurs in each droplet 12, so that there is order among the directors from droplet to droplet, as shown symbolically in FIG. 1b. When the liquid crystal molecules are aligned in this manner, the liquid crystal index of refraction with which incident light ray 18 operatively interacts is $n_o$. Because $n_o$ is substantially the same as $n_m$, there is no scattering at the liquid crystal-matrix material interface. As a result, ray 18 is transmitted through composite 11, which now appears transparent. Transmission rates of at least 50%, and preferably on the order of 70% or higher, may be attained.

Figure 2A:
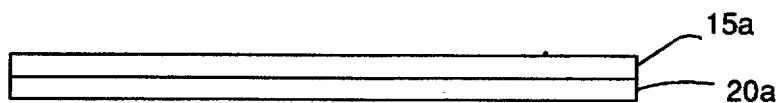
FIGS. 2a–2e show schematically a method of making a liquid crystal light valve according to this invention.
Figure 2B:
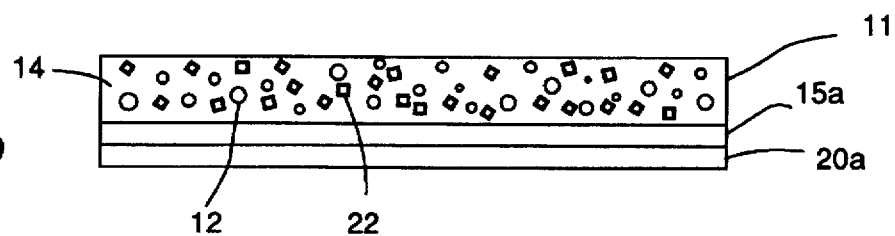
Figure 2C:
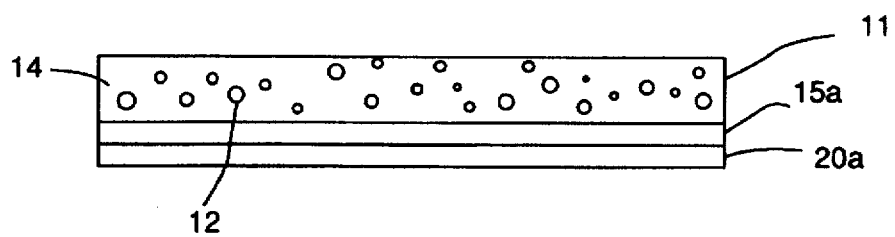
Figure 2D:
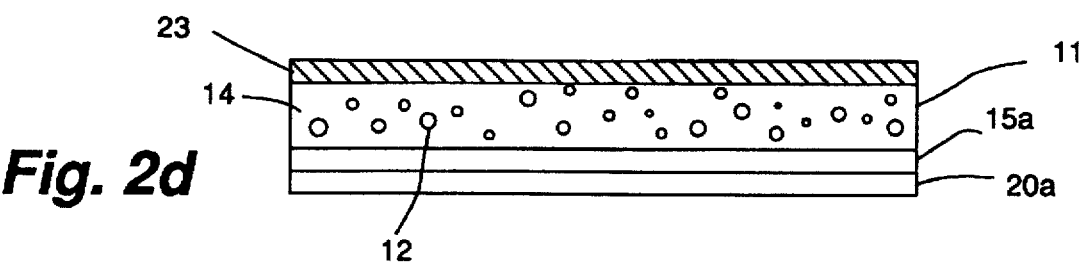

The invention is schematically illustrated in FIGS. 2a–2e. Starting with first electrode 15a supported on support material 20a (FIG. 2a), a layer of composite 11, comprising matrix material 14, plural volumes 12 of liquid crystal material 13 dispersed therein, all carried in carrier medium 22, is coated thereon (FIG. 2b). Carrier medium 22 is permitted to evaporate, typically for 20–30 min at room temperature, leading to the situation depicted in FIG. 2c. The thickness of composite 11 typically is between 10 and 20 μm prior to drying and between 6 and 12 μm afterwards. In the figures, the thickness has been shown as invariant for simplicity. A tie layer 23 is deposited on composite 11, for example by spraying. Tie layer 23 may itself be carried by a carrier medium or dissolved in a solvent such as water, or alcohol, in which case the carrier medium or solvent is also permitted to evaporate (FIG. 2d), again typically for 20–30 min at room temperature. Finally, second electrode 15b supported on second support material 20b is laminated on top (FIG. 2e), producing a liquid crystal light valve which exhibits little or no stress clearing. Lamination may be effected by heating the two halves on a hot plate set at 60° C. for 2–5 min, with the substrate facing the hot plate's surface and pressing together. Aside from solving the stress clearing problem, tie layer 23 has little effect on the electro-optical performance of light valve 10 and therefore was omitted from the above discussion of the operation of light valve 10 (FIGS. 1a–1b).

Figure 2E:
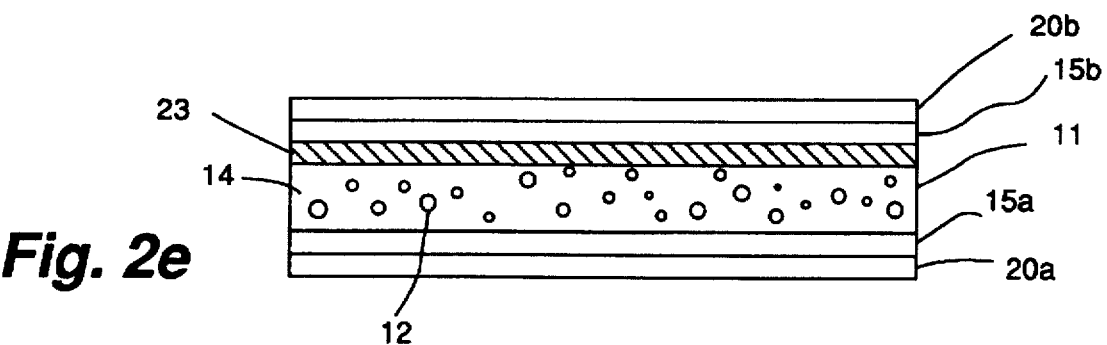
Figure 3:
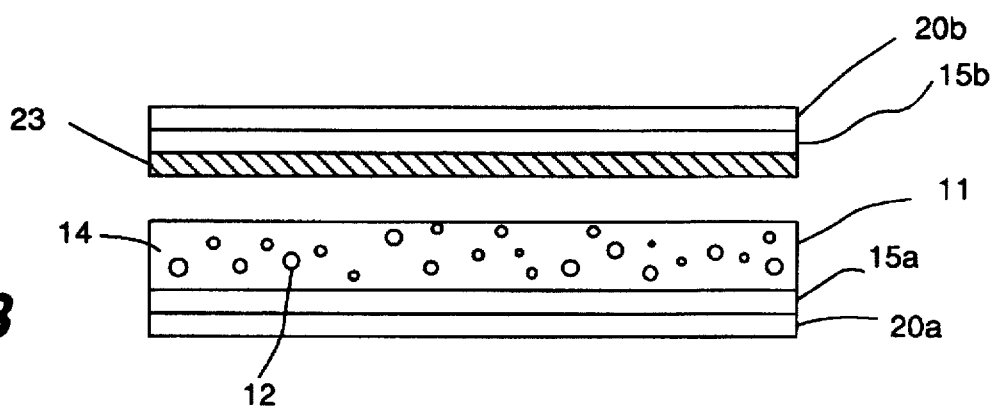
FIG. 3 shows an alternative method according to this invention.

Alternatively, tie layer 23 can be applied to second electrode 15b, as shown in FIG. 3, and, after drying, laminated to produce the same structure as shown in FIG. 2e.

Those skilled in the art will appreciate that in the foregoing figures various simplifications have been made for the sake of simplicity or clarity. The droplets or volumes 12 of liquid crystal material 13 have been shown as having a spherical shape as a matter of convenience. Other shapes are possible, for example oblate spheroids, irregular shapes, or dumbbell-like shapes in which two or more droplets are connected by channels. The relative thicknesses of the various layers of support materials 20a–20b, electrodes 15a–15b, composite 11, and tie layer 23, and the size of droplets or volumes 12, are not to scale. One or the other may have been exaggerated for clarity. Electrodes 15a and 15b have been shown as completely covering substrates 20a and 20b, but this is not always necessarily so. When making a display, an electrode may cover only selected portions of its support material, so that only such selected portions are electro-optically active, as in the commonly used seven-segment pattern for rendering numeric characters in calculator displays. The surfaces of the various layers have been depicted as being perfectly smooth, but in actuality there will be some roughness at the microscopic level.

Typically, composite 11 is coated onto electrode 15a/ substrate 20a as an emulsion. The emulsion may be prepared by rapidly agitating a mixture of liquid crystal material, matrix material, and a carrier medium, typically water. The carrier medium may also be a water-alcohol mixture. Optionally, an emulsifier, wetting agent, or other surface active agent may be added. Suitable emulsification techniques are disclosed in Fergason '047, Kamath '445, and Andrews '063. The emulsion may be coated by a variety of techniques, such as doctor blade coating, slot die coating, dip coating, spin coating, and the like.

The matrix material is preferably a polymeric material. Suitable matrix materials include but are not limited to poly(vinyl alcohol) ("PVA") and its copolymers, gelatin, polyurethane, latexes, poly(ethylene oxide), poly(vinyl pyrrolidone), cellulosic polymers, natural gums, acrylic and methacrylic polymers and copolymers, epoxies, polyolefins, vinyl polymers, and the like. PVA is a preferred matrix material.

While we do not wish to be bound by theory, it is believed that the tie layer operates as follows to solve the stress clearing problem. Intimate contact between the composite layer and the second (top) electrode is needed for optimal electro-optical performance. However, in a real-life situation, there often are irregularities and roughness in the surface of the composite layer and/or warpage of one or more of the electroded surfaces. During lamination, the pressure applied to ensure intimate contact between the composite and the electrode material leads to stress-induced clearing. The tie layer is an electro-optically inert viscous material which alleviates the surface roughness and irregularities and forms a pliable cushioning layer to prevent stress-induced clearing.

In one embodiment, the tie layer material is itself a liquid crystal material. Preferably, the liquid crystal material is the same as the liquid crystal material which is dispersed in the matrix material, for example TL205 from Merck.

In a second embodiment, the tie layer material is an amphiphilic telomer. A preferred amphiphilic telomer has the formula

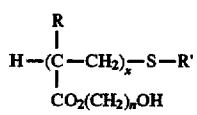

(I)

where R is $CH_3$ or H; R' is a $C_4$ to $C_{18}$ alkyl or fluoroalkyl group; n is an integer between 2 and 6 inclusive; and x is an integer between 3 and 26 inclusive. A telomer may be viewed as a tailored oligomer having defined end groups. Specific preferred telomers (I) include:

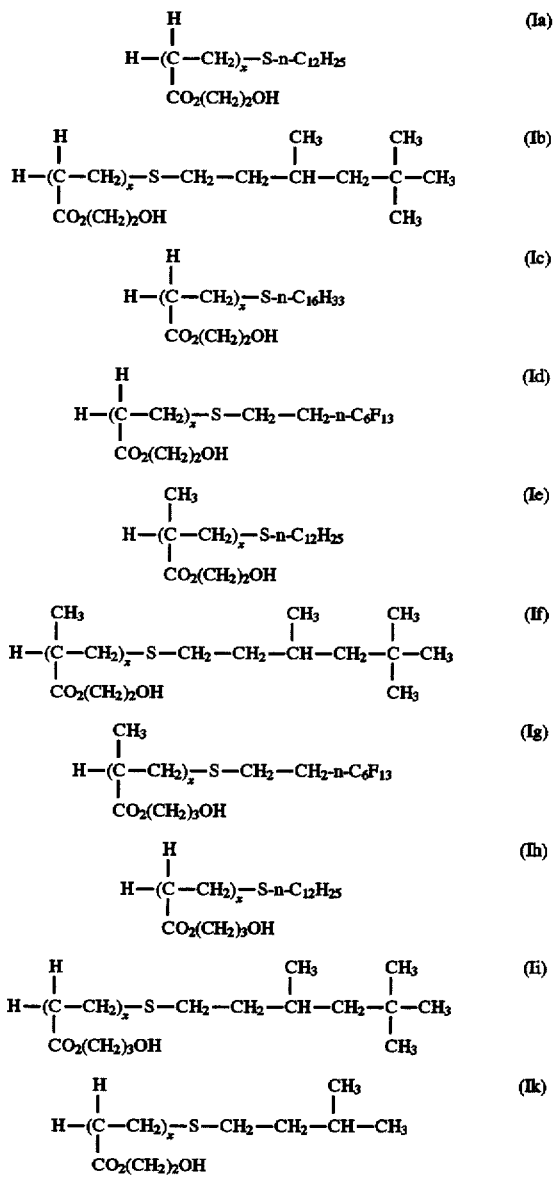

Telomers (Ia) and (Id) are especially preferred. These and other suitable telomers may be prepared by a free-radical telomerization reaction between a taxogen and a telogen, as disclosed in Lau, U.S. Pat. No. 5,395,550 (1995) (hereinafter "Lau '550"), incorporated by reference.

In a third embodiment, the tie layer material is a crosslinkable telomer (II) according to the formula

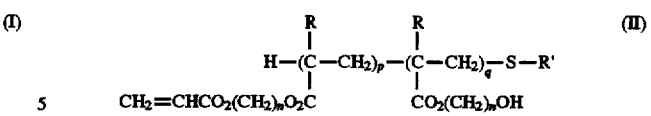

(II)

where R, R', n are as previously defined; the sum (p+q) is an integer between 3 and 26, inclusive; p is a number between 1 and 4, inclusive; and the ratio p/q is between 1/20 and 1/4. Preferably the ratio p/q is about 1/10. It is to be understood that in the above formula p and q denote relative molar amounts, and not that the telomer is "blocky" in character, with distinct blocks of repeating units containing acrylated side chains and blocks of hydroxy-terminated side chains. In fact, it is believed that the two types of side chains are randomly distributed. Crosslinkable telomer (II) may be made by partial esterification of a corresponding telomer (I) with acryloyl chloride.

The tie layer material may be applied onto either the dried composite or onto the electrode/support material onto which it is to be laminated, or both. Generally, the tie layer material is dissolved in an appropriate solvent and then applied. Where the tie layer material is a liquid crystal material, the solvent can be an organic solvent such as toluene. Where the tie layer material is a compound (I), which is more polar, the solvent can be water or a more polar organic solvent such as an alcohol. Techniques for applying the tie layer material include doctor blade coating, dip coating, spray coating, spin coating, and air brushing. The tie layer preferably is between 0.01 and 1.0 μm thick, more preferably between 0.1 and 0.5 μm thick. Thicker tie layers cause slipping during the lamination, whereas if the tie layer is too thin, stress clearing may still occur.

The electrode/support material combination may be as simple as a layer of ITO on glass or polyester, which would be a typical construction for window, privacy panel, or simple display applications. Other transparent conductors, such as thin films of gold, copper, aluminum, etc. may also be used. For displays intended to depict complex images, for example in graphical displays, an active matrix may be used, in which semiconductor elements are formed on and supported by an underlying silicon wafer. Graphical displays can be of the direct view or front or rear projection type.

The liquid crystal material may contain dissolved therein a dye, preferably a pleochroic or isotropic dye, in order to produce colored visual effect. Preferably, the liquid crystal material is operationally nematic and has a positive dielectric anisotropy.

Optionally, the liquid crystal material may be separated from the matrix material by one or more intervening materials, in order to optimize the electro-optical performance of the light valve, as taught in Havens '268 and Reamey '551.

Often, in this art, a change made to improve light valve performance in one aspect is negated by a decrement in performance in another aspect. An advantage of the present invention is that while improving the stress-clearing resistance of the liquid crystal composite, the tie layer material does not seem to negatively affect electro-optical properties such as switching speed, hysteresis, voltage holding ratio, and rise and fall times. The practice of our invention may be further understood by reference to the following examples, which are provided by way of illustration and not limitation. (Numerical results are the average of three to four data points.) The following general procedures were used in making these measurements of electro-optical properties.

Optical measurements were obtained with f/3.5 collection optics and a collimated 550±40 nm light source. For each test, $T_{on}$ is the maximum transmission in the presence of a voltage, $T_{off}$ is the percent transmission in the absence of an applied voltage, and $E_{90}$ is the field (in volt per micron (V/μm)) required to turn a device on to $T_{90}$ (as defined below). In order to measure $T_{90}$ and $E_{90}$, samples were stepped up and down in voltage (25 steps up/25 steps down, 0.5 sec/step) to a relatively high field (typically 8–10 V/μm). The value $T_{90}$ is given by the equation $$T_{90}=0.9(T_{on}-T_{off})+T_{off}$$

The applied field needed to reach $T_{90}$ on the up curve is $E_{90}$ (the up curve being the % T/V curve obtained with increasing voltage). $E_{90}$ is substantially independent of sample thickness. The corresponding operating voltage $V_{90}$ is thickness-dependent and has units of volts. $V_{90}$ is obtained by multiplying $E_{90}$ by the thickness (d) in microns of the liquid crystal structure ($V_{90}=d \cdot E_{90}$).

The switching speed of a device is a measure of the time for a film of encapsulated liquid crystal material to turn on or off with the application or removal of a voltage. One way to measure switching speed is to monitor the optical response of the film while applying and then removing the voltage. Switching speeds were obtained by giving a sample a 1 sec, 33.3 Hz square wave signal at $E_{90}$. The time it takes a device to go from 10% to 90% of its final response, when the voltage is applied may be referred to as the "rise time" or $T_{rise}$, while the time for the device to drop from 90% to 10% of its response, upon removal of the voltage, may be referred to as the "fall time" or $T_{fall}$. The measured switching speeds depend on the voltage applied. For displays that show moving graphics, it is desirable to have rise and fall times of less than about 50 msec.

The voltage holding ratio (VHR) is the percentage of the originally applied voltage that remains at the end of a 15 msec hold time. VHR was measured by applying a series of alternating polarity voltage pulses to the devices. The pulses were 30–300 μm sec in duration and were applied every 15 msec. During the 15 msec hold time, the device was held in open circuit and the decay of the applied voltage across the device was monitored. The VHR measurement was taken at "steady state," which for most devices tested was obtained after 20 pulses. Larger values of VHR are more desirable. The VHR measurement was normally performed at or above $E_{90}$. Displays of the present invention preferably have a VHR that is at least 70%, more preferably at least 80%, and most preferably at least 90%.

A device may show hysteresis in its optical response—the optical response of a device at a given voltage depends on whether the device reached the given voltage from a previously higher or lower voltage. Many displays are designed such that a given electrical signal (voltage) should correspond to a desired optical response. Hysteresis degrades the ability of the device to accurately reach that desired optical response. This would have the effect of lowering the number of gray levels in a high resolution display. One way to measure hysteresis is to ramp the voltage applied to the device up and then down to compare optical response curves. The greater the difference between the up and down curves, the greater the hysteresis. The hysteresis value for a device would depend strongly on the time and voltages used in the test. In most applications, it is desired to have the hysteresis as low as possible: less than 20% difference, with less than 6% preferred.

Contrast ratio (CR) is defined by the equation $$CR=\frac{T_{on}}{T_{off}}$$

A figure of merit (FOM) may be defined by the equation $$FOM=\frac{CR}{V_{90} \cdot (F/\#)^2}$$

where f/# is the f-stop and typically has a value of 3.5. This figure of merit may be used to estimate the overall performance of a light valve, taking into account the operating voltage, the contrast ratio, and the system optics.

EXAMPLE 1

This example demonstrates the use of a liquid crystal material as the tie layer material. An emulsion of liquid crystal composite was prepared by emulsifying a solution of 20 parts UV-curable acrylate (PN393™ from EM Industries) in 100 parts liquid crystal material (TL205™ from EM Industries) to a volume mean diameter of 2.0 μm in a 10% aqueous solution of PVA (Airvol 205™ from Air Products). After allowing it to defoam by sitting at room temperature for 4–5 hr, the emulsion was chilled to 4° C. in a refrigerator. Under a 2° C. nitrogen stream and with constant stirring with a magnetic stirrer, the emulsion was exposed to UV light at an intensity of 11 mW/cm² for 5 min. After irradiation, the capsules of liquid crystal material were separated from the PVA solution by centrifugation and redispersed in a 10 wt % aqueous suspension of a 50/50 wt/wt mixture of PVA and polyurethane latex (NeoRez™ from ICI Resins) to a solids content of 35–40%. The final emulsion was filtered through a 5 μm membrane. The filtered emulsion was coated onto an ITO-electroded glass plate and allowed to dry at ambient temperature, per the procedure illustrated in FIGS. 2b–2c. The preferred thickness of the dried composite is 7 to 12 μm, most preferably about 10 μm. This same procedure also was used to make the liquid crystal composites in subsequent Examples 2 and 3.

After drying, liquid crystal TL205 was applied neat as a tie layer material by air brushing on to the composite, to a thickness of about 0.5 μm. Fabrication of the light valve was completed by laminating with the top (counter) electrode/substrate. Table 1 shows how the samples having the tie layer do not exhibit either stress-induced clearing or any deleterious effect on their electro-optical properties.

TABLE 1

| Sample | Tie Layer | Stress Clearing | Thickness of Liquid Crystal composite (μm) | $T_{off}$ (%) | $T_{on}$ (%) |
|---|---|---|---|---|---|
| 1 | None | Yes | 6.2 | 6.1* | 86.3* |
| 2 | TL205 | No | 5.8 | 6.5 | 84.7 |
| 3 | TL205 | No | 6.5 | 5.8 | 85.4 |
| 4 | TL205 | No | 7.1 | 5.0 | 85.0 |

| Sample | VHR (%) | $E_{90}$ (V/μm) | FOM | Hysteresis (%) | $T_{rise}$ (msec) | $T_{fall}$ (msec) |
|---|---|---|---|---|---|---|
| 1* | 98 | 0.72 | 0.26 | 26 | 88 | 71 |
| 2 | 99 | 0.73 | 0.25 | 25 | 84 | 73 |
| 3 | 98 | 0.71 | 0.26 | 25 | 91 | 75 |
| 4 | 97 | 0.69 | 0.29 | 26 | 104 | 72 |

*Measured on non-cleared areas.

EXAMPLE 2

This example demonstrates the use of a telomer (I) as the tie layer material. A liquid crystal composite was prepared as in Example 1. The tie layer (10% aqueous solution) was applied with a doctor blade onto the top of the liquid crystal composite/ITO/glass plate combination, as illustrated in FIGS. 2a–d. The results are provided in Table 2. It can be seen that the stress cleared areas without any tie layer present show an unacceptably high $T_{off}$ of greater than 15%.

TABLE 2

| Sample | Tie Layer Material | Degree of Polymerization (x) | Stress Clearing | Thickness (μm) | $T_{off}$ (%) | VHR (%) |
|---|---|---|---|---|---|---|
| 5 | None | N/A | Yes | 6.0 | — | — |
|   | Clear area |   |   |   | 16.2 | 98 |
|   | Non-clear area |   |   |   | 6.3 | 98 |
| 6 | Ia[a] | 7.0 | No | 7.3 | 5.7 | 77 |
| 7 | Ia[a] | 7.3 | No | 7.3 | 5.7 | 79 |
| 8 | Id[b] | 7.0 | No | 6.5 | 6.8 | 86 |

[a] Ethanol solution (10 wt %)
[b] Aqueous solution (10 wt %)

| Sample | $E_{90}$ (V/μm) | CR/t (μm$^{-1}$) | FOM | Hysteresis (%) | $T_{rise}$ (msec) | $T_{fall}$ (msec) |
|---|---|---|---|---|---|---|
| 5 (clear area) | 0.88 | 0.87 | 0.88 | 3 | 33 | 113 |
| 5 (non-clear area) | 0.76 | 2.20 | 0.24 | 16 | 77 | 66 |
| 6 | 0.59 | 2.07 | 0.28 | 30 | 95 | 108 |
| 7 | 0.61 | 2.08 | 0.29 | 29 | 91 | 103 |
| 8 | 0.66 | 1.93 | 0.24 | 27 | 79 | 91 |

EXAMPLE 3

This examples provides additional data showing the effectiveness of telomers (I) as tie layer materials. The procedure of Example 1 was followed to prepare a composite coating on the bottom electrode/substrate. The tie layer material was applied by air brushing a 10 wt % aqueous solution of telomer (I) onto the top (counter electrode) as shown in FIG. 3. The results are provided in Table 3. No stress clearing was observed in the specimens in which a tie layer was employed, while the ones without the tie layer had a $T_{off}$ value of over 11%, which is unacceptably high. Compared to the control samples, the ones containing the tie layer reduces $E_{90}$ and increases hysteresis and switching speeds somewhat (but not to unacceptable levels). Voltage holding ratios of ≧92% were retained.

TABLE 3

| Sample | Tie Layer Material | Degree of Polymerization (x) | Stress Clearing | Thickness (μm) | $T_{off}$ (%) | VHR (%) |
|---|---|---|---|---|---|---|
| 9 | None | N/A | Yes | 6.1 | — | — |
|   | Clear area |   |   |   | 11.6 | 98 |
|   | Non-clear area |   |   |   | 6.3 | 98 |
| 10 | Ia | 7.0 | No | 7.1 | 5.5 | 92 |
| 11 | Ia | 8.0 | No | 6.4 | 6.2 | 93 |
| 12 | Ib | 6.0 | No | 6.4 | 6.3 | 93 |
| 13 | Id | 4.0 | No | 6.3 | 5.1 | 94 |
| 14 | Id | 7.0 | No | 7.2 | 5.7 | 93 |
| 15 | Id | 9.0 | No | 7.3 | 5.6 | 93 |

| Sample | $E_{90}$ (V/μm) | CR/t (μm$^{-1}$) | FOM | Hysteresis (%) | $T_{rise}$ (msec) | $T_{fall}$ (msec) |
|---|---|---|---|---|---|---|
| 9 (clear area) | 0.80 | 1.18 | 0.12 | 7 | 57 | 79 |
| 9 (non-clear area) | 0.74 | 2.19 | 0.24 | 16 | 81 | 65 |
| 10 | 0.64 | 2.23 | 0.29 | 28 | 91 | 108 |
| 11 | 0.65 | 2.18 | 0.27 | 29 | 94 | 98 |
| 12 | 0.68 | 2.14 | 0.26 | 22 | 81 | 94 |
| 13 | 0.72 | 2.21 | 0.25 | 23 | 77 | 82 |
| 14 | 0.71 | 1.98 | 0.23 | 14 | 72 | 76 |
| 15 | 0.70 | 2.07 | 0.24 | 15 | 76 | 73 |

EXAMPLE 4

This example demonstrates the use of telomer tie layer materials on a liquid crystal composite made with a different liquid crystal material, TL213™ from Merck. An emulsion of the composite was prepared following the procedure described in Example 1, except that liquid crystal material TL205 was replaced by liquid crystal material TL213 and PN393 was replaced with a blend of reactive additives, consisting of 63 parts n-pentyl acrylate, 27 parts n-hexyl acrylate, 10 parts Photomer™ (tetraacrylated oligomer of aliphatic ester, from Henkel), and 1 mole % Darocur 4265™ (Ciba-Geigy). The results are provided in Table 4:

TABLE 4

| Sample | Tie Layer Material | n (observed) | Stress Clearing | Thickness (μm) | $T_{off}$ (%) | VHR (%) |
|---|---|---|---|---|---|---|
| 16 | None | N/A | Yes | 7.0 | — | — |
|    | Non-clear area |   |   |   | 5.0 | 97 |
| 17 | Ia | 7.0 | No | 8.1 | 4.5 | 92 |
| 18 | Ia | 6.0 | No | 7.6 | 5.9 | 76 |
| 19 | Id | 7.0 | No | 7.1 | 5.0 | 96 |
| 20 | Id | 9.0 | No | 8.3 | 4.1 | 91 |

| Sample | $E_{90}$ (V/μm) | CR/t (μm$^{-1}$) | FOM | Hysteresis (%) | $T_{rise}$ (msec) | $T_{fall}$ (msec) |
|---|---|---|---|---|---|---|
| 16 (non clear area) | 0.86 | 2.48 | 0.24 | 11 | 59 | 46 |
| 17 | 0.70 | 2.41 | 0.28 | 15 | 69 | 69 |
| 18 | 0.68 | 1.95 | 0.23 | 11 | 52 | 78 |
| 19 | 0.84 | 2.43 | 0.24 | 11 | 66 | 52 |
| 20 | 0.81 | 2.52 | 0.25 | 12 | 59 | 53 |

EXAMPLE 5

This example illustrates the preparation of a crosslinkable telomer (II) where n is 2, R is H and R' is isopentyl. A 500 mL round bottom flask containing a solution of 2,2'-azobisisobutyronitrile (AIBN, 0.07 g, 0.36 mmol) and isopentyl thiol (1.04 g, 10.0 mmol) in 2-hydroxyethyl acrylate (17.42 g, 150.0 mmol) was purged with dry nitrogen for 5 min. The flask was lowered into an oil bath at 60° C. with constant stirring. Telomerization occurred within 10 min and the flask was kept in the oil bath for an additional 60 min. Unreacted starting materials and low boiling oligomers were removed under vacuum distillation at 65° C. and 0.02 mm Hg for 5 hr to give a viscous, water clear telomer (17.0 g) with a structure corresponding to telomer (Ik). $^{13}$C-NMR (CDCl$_3$) (ppm): 174.19 (C=O), 65.75 (CH$_2$ α to ester oxygen), 58.88 (CH$_2$ α to hydroxyl), 34.42 (CH$_2$ α to CH), 31.0 (CH with two methyl's attached), 26.78 (CH$_2$ α to S), and 22.15 (CH$_3$). (Some carbon peaks were hidden by solvent peaks.) Integration of the peaks at 174.19 and 26.78 ppm suggested the degree of polymerization was 20.

The telomer was dissolved in acetonitrile (150 mL) at about 75° C. The solution was cooled to room temperature and anhydrous sodium carbonate (1.59 g, 15 mmol) and acryloyl chloride (1.81 g, 20.0 mmol) were added. The mixture was stirred at room temperature overnight. Any insoluble material was filtered off and the solvent was removed under reduced pressure at about 30° C. Any unreacted acryloyl chloride was removed by vacuum distillation at 45° C. and 0.1 mm Hg over 5 hr in the dark to give a water clear, viscous liquid which was completely miscible with water (18.5 g). $^{13}$C-NMR of the product exhibited additional peaks at 165.39 ppm (acryloyl C=O)and 62.18 ppm (CH$_2$ groups between 2 ester oxygen's). Integration of the peaks at 62.18 ppm and 65.78 ppm suggests the ratio p/q is 1.6/18.4, or 0.087.

EXAMPLE 6

This example describes the use of the crosslinkable telomer of the previous example as a tie layer material. An emulsion of liquid crystal composite with TL213 liquid crystal material was prepared according to Example 4.

A slightly cloudy aqueous solution was prepared by vigorously stirring crosslinkable telomer (99 parts by weight (ppw)), photoinitiator (Darocur 4265 from Ciba-Geigy, 1 ppw), and solvent (either water (900 ppw)or 2-hydroxyethyl acrylate (HEA) (200 ppw)). The tie layer solution was air-brushed onto the liquid crystal composite layer. After drying, the composite was laminated with a top electrode and exposed to UV light for 5 min to crosslink it. This example demonstrates the feasibility of crosslinking the tie-layer material by shining UV light through top support material 20a, first electrode 15a, and the liquid crystal composite. The results are provided in Table 5.

TABLE 5

| Sample | Tie Layer | Stress Clearing | Thickness (μm) | Temperature (°C.) | T$_{off}$ (%) | VHR (%) |
|---|---|---|---|---|---|---|
| 21 | None | Yes | 12.3 | 5 | 1.53$^c$ | 97$^c$ |
|  |  |  |  | 25 | 1.62$^c$ | 97$^c$ |
|  |  |  |  | 45 | 1.73$^c$ | 93$^c$ |
| 22 | Yes$^a$ | No | 10.2 | 5 | 2.01 | 95 |
|  |  |  |  | 25 | 2.11 | 96 |
|  |  |  |  | 45 | 2.23 | 90 |
| 23 | Yes$^b$ | No | 12.5 | 5 | 1.55 | 97 |
|  |  |  |  | 25 | 1.64 | 97 |
|  |  |  |  | 45 | 1.75 | 93 |

$^a$(10% aq. solution)
$^b$(33.3% HEA Solution)
$^c$Measure on non-clear areas

| Sample | E$_{90}$ (v/μm) | CR/t (μm$^{-1}$) | Figure of Merit | Hysteresis (%) | T$_{rise}$ (msec) | T$_{fall}$ (msec) |
|---|---|---|---|---|---|---|
| 21 | 0.99 | 4.48 | 0.37 | 16.2 | 148 | 80 |
|  | 0.88 | 4.22 | 0.39 | 9.4 | 49 | 30 |
|  | 0.85 | 3.98 | 0.38 | 8.7 | 21 | 17 |
| 22 | 0.97 | 4.23 | 0.36 | 15.5 | 131 | 103 |
|  | 0.90 | 4.01 | 0.36 | 9.3 | 41 | 40 |
|  | 0.84 | 3.78 | 0.37 | 9.0 | 18 | 23 |
| 23 | 0.95 | 4.35 | 0.37 | 16.6 | 157 | 81 |
|  | 0.86 | 4.09 | 0.39 | 8.9 | 49 | 30 |
|  | 0.82 | 3.86 | 0.38 | 9.5 | 22 | 17 |

The foregoing detailed description of the invention includes passages which are chiefly or exclusively concerned with particular parts or aspects of the invention. It is to be understood that this is for clarity and convenience, that a particular feature may be relevant in more than just passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extent appropriate, in the context of another figure, in combination with another feature, or in the invention in general.

What is claimed is:

1. A method of making a liquid crystal light valve, comprising the steps of:

providing a first electrode supported on a first support material;

applying over said first electrode a coating of a liquid crystal composite comprising plural volumes of liquid crystal material dispersed in a matrix material, said liquid crystal composite being carried in a carrier medium;

permitting said carrier medium to evaporate, leaving a layer of said liquid crystal composite disposed on said first electrode;

providing a second electrode supported on a second support material;

applying a tie layer material onto at least one of the face of said layer of liquid crystal composite facing away from said first electrode and the face of said second electrode facing away from said second support material, the tie layer material being selected from the group consisting of (i) a liquid crystal material;

(ii) a telomer according to the formula

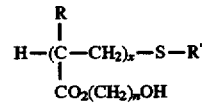

(iii) a crosslinkable telomer according to the formula

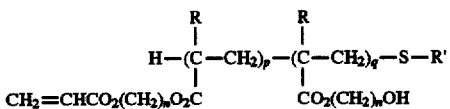

where in the preceding formulae R is CH$_3$ or H; R' is a C$_4$ C$_{18}$ alkyl or fluoroalkyl group; n is an integer between 2 and 6 inclusive; x is an integer between 3 and 26, inclusive; the sum (p+q) is an integer between 3 and 26, inclusive; p is a number between 1 and 4, inclusive; and the ratio p/q is between 1/20 and 1/4; and laminating said second electrode onto the face of said layer of liquid crystal composite facing away from said first electrode.

2. A method according to claim 1, wherein said tie layer material is a liquid crystal material.

3. A method according to claim 1, wherein said tie layer material is a telomer according to the formula

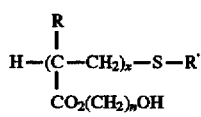

where R is $CH_3$ or H; R' is a $C_4$ to $C_{18}$ alkyl or fluoroalkyl group; n is an integer between 2 and 6 inclusive; and x is an integer between 3 and 26 inclusive.

4. A method according to claim 1, wherein said tie layer material is a crosslinkable telomer according to the formula

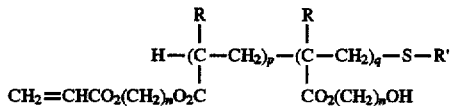

where R is $CH_3$ or H; R' is a $C_4$ to $C_{18}$ alkyl or fluoroalkyl group; n is an integer between 2 and 6 inclusive; the sum (p+q) is an integer between 3 and 26, inclusive; p is a number between 1 and 4, inclusive; and the ratio p/q is between 1/20 and 1/4.

5. A method according to claim 1, 2, 3, or 4, wherein said tie layer material forms a layer between 0.01 and 1.0 μm thick.

6. A method according to claim 1, 2, 3, or 4, wherein the tie layer material is applied onto said layer of liquid crystal composite.

7. A method according to claim 1, 2, 3, or 4, wherein said tie layer material is applied onto said second electrode.

8. A method according to 1, 2, 3, or 4, wherein said tie layer material is applied by doctor blade coating, dip coating, spray coating, spin coating, or air brushing.

* * * * *